(12) United States Patent
Willing

(10) Patent No.: US 6,428,175 B1
(45) Date of Patent: Aug. 6, 2002

(54) ADVISORY LIGHTING FITTING

(75) Inventor: Achim Willing, Schesslitz-Doschendorf (DE)

(73) Assignee: Dr.-Ing. Willing GmbH (DE)

( * ) Notice: Subject to any disclaimer, the term of this patent is extended or adjusted under 35 U.S.C. 154(b) by 0 days.

(21) Appl. No.: 09/395,585

(22) Filed: Sep. 14, 1999

(30) Foreign Application Priority Data

Sep. 14, 1998 (DE) .......................................... 198 41 962
Jan. 25, 1999 (DE) .......................................... 199 02 774

(51) Int. Cl.⁷ .............................................. G09F 13/00
(52) U.S. Cl. ......................... 362/31; 362/293; 362/230; 362/812; 362/231
(58) Field of Search ........................ 362/31, 230, 231, 362/800, 812, 293; 40/546

(56) References Cited

U.S. PATENT DOCUMENTS

| 4,974,354 A | * 12/1990 | Hembrook, Jr. ............. 40/546 |
| 5,027,258 A |   6/1991  | Schoeniger et al. |
| 5,124,890 A | *  6/1992 | Choi et al. .................... 362/27 |
| 5,572,818 A | * 11/1996 | Churchill ..................... 40/547 |
| 5,743,616 A | *  4/1998 | Giuliano et al. ............. 362/231 |

FOREIGN PATENT DOCUMENTS

| DE | 195 14 649 A1 | 10/1996 |
| EP | 0 403 764 A1 | 12/1990 |
| EP | 0 617 394 A1 | 9/1994 |
| WO | WO 95 16983 | 6/1995 |

* cited by examiner

*Primary Examiner*—Thomas M. Sember
(74) *Attorney, Agent, or Firm*—Marshall & Melhorn, LLC

(57) ABSTRACT

An advisory lighting with a luminous body has at least one light-radiating light outlet surface. The light outlet surface is divided up into part surfaces radiating in various colours. A light source arrangement radiates light into the luminous body, wherein the luminous body has a light conducting plate arrangement or a hollow body arrangement with limiting walls. The luminous body is composed of light conducting plates or hollow bodies arranged above, next to and/or in each other and having various part surfaces. Various light sources are assigned to the light conducting plates or hollow bodies, corresponding to the part surfaces radiating in various colors, which light sources radiate variously coloured light into the respective light conducting plates or hollow bodies.

15 Claims, 9 Drawing Sheets

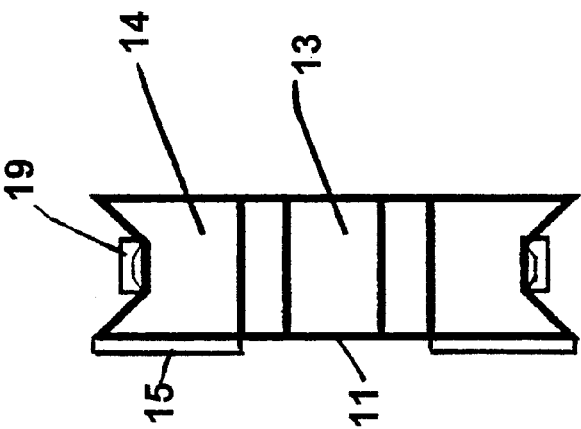
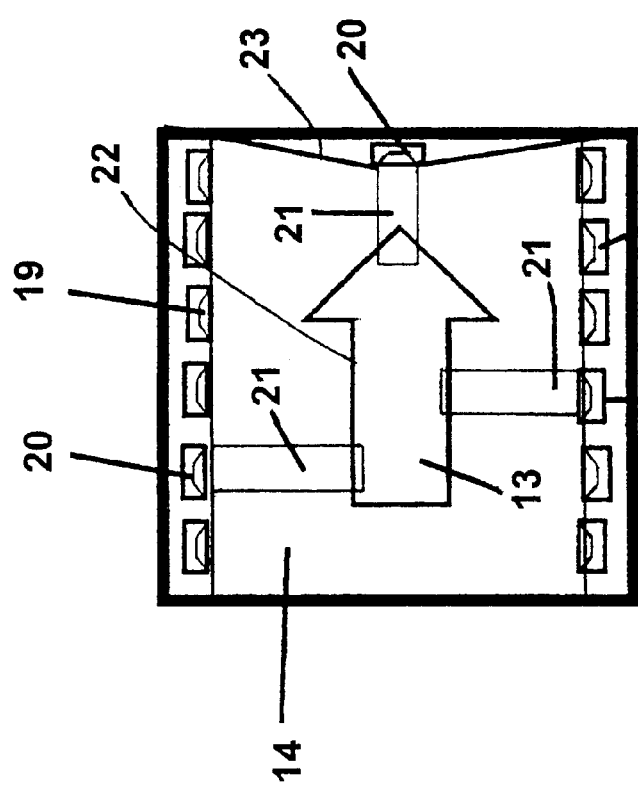
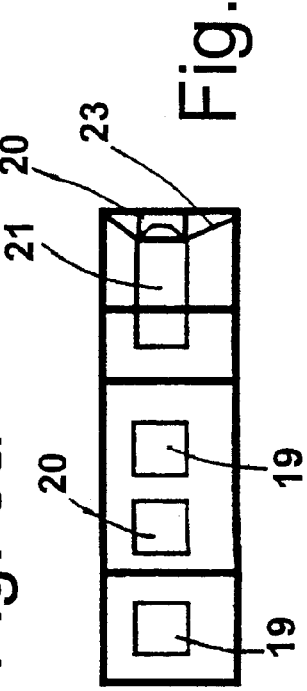
Fig. 9c
Fig. 9b
Fig. 9a

ADVISORY LIGHTING FITTING

BACKGROUND OF THE INVENTION

The invention concerns an advisory lighting fitting with a luminous body, in particular an emergency sign light.

Advisory lighting fittings familiar from the state of the art consist of a luminous body, which has a light-radiating light outlet surface, which is divided up into part surfaces radiating in various colours. Here the part surfaces in one colour are defined, for example, by means of pictogram elements or advisory elements, while the part surfaces or part surface in the other colour form the background or frame for the advisory elements. Usually, light is radiated into the luminous body from at least one light source, the light being reflected on the limiting surfaces of the luminous body and then emitted via the light outlet surface. The luminous body may consist of one or more transparent, flat light-conducting bodies exploiting the lighting effect, in whose side edges light is stored and from the surface of which light is deflected through arrangements interrupting the total reflection. In another embodiment of the state of the art, the luminous body consists of a flat hollow-body with translucent light-radiating covers towards at least one side, often towards the two opposite sides also. In the hollow space either lamps and reflectors are arranged to provide rear lighting for the advisory elements or light is radiated in a light pocket via at least one longitudinal side of the luminous body.

According to the international standard, the advisory lighting fittings are usually characterised by a green and a white radiating surface. According to the state of the art, the colour of light of the white-radiating surface parts is acquired from the colour of light of the light source, such as the fluorescent lamp, electric light bulb or light-radiating diode, or rather the LED combination, while the coloured portion of the advisory lighting fitting, the green colour in the case of emergency signs, is acquired through spectral filtering of the white light. The luminous flux requirement of the sign is therefore calculated from the luminous flux requirement of the white surface because this is used according to the state of the art to provide rear lighting for the coloured surface parts.

For emergency signs, an average luminance of 200 cd/m$^2$ of the light-radiating pictogram surface is required for mains operation in a bright environment according to the German standard DIN 4844, this with a white/green illuminance contrast >5:1 and a green surface content of at least 50%. With a normal surface content of white colour of 33%, a luminance of the white surface of 425 cd/m$^2$ is produced in order to meet the requirement of an average luminance of 200 cd/m$^2$.

For a single-sided radiating surface of 150 mm×300 mm, at diffuse light radiation, from the above luminances a luminous flux requirement of light radiation of 60 lm with a luminance of 425 cd/m$^2$ is produced according to this calculation.

Under conditions of emergency operation, the required luminance will be considerably reduced. Thus a minimum luminance of 5 cd/m$^2$ is required for the green-radiating surfaces. Because of the illuminance contrast requirement, a minimum luminance of 25 cd/m$^2$ will therefore result for the white surfaces. This means when converted that the luminous flux required for the emergency operation can be reduced by a factor 19 vis-á-vis the mains operation.

To satisfy the requirements when using light-emitting diodes as a light source, which usually have a very much longer service life than electric light bulbs and normal fluorescent lamps, an electric rating of 20 to 24 W ought to be installed in a bright environment, given a typical luminous efficiency of 10 lm/W, and for emergency operation 1 to 1.2 W specific to a double-sided radiating sign of the size 150×300 mm. However, not only is this no longer an economic use of energy, but also more than 300 light-emitting diodes are needed to meet the requirements given a specific output of typically 0.05 to 0.1 W per diode. Even with a sought-after output of 0.2 W per diode, 115 light-emitting diodes are still needed. This leads to uneconomically high manufacturing costs. Similar considerations apply to other colour combinations, too.

With the use of conventional lighting, especially fluorescent lamps with normal diameters of 16 mm, poor light output ratios may have to be accepted due to the high luminous efficiency. With the use of light-emitting diodes, the light output ratio again plays a fundamental role in the economic efficiency. The light output ratio of a colourfully radiating luminous body results, on the one hand, from the losses in the production of the coloured light, while, on the other hand, with punctiform light sources such as light-emitting diodes, further losses result from the conversion of the luminous density distribution in all-over radiating light outlet surfaces.

OBJECT OF THE INVENTION

The aim of the invention therefore is to create an advisory lighting fitting with a luminous body which has at least one light outlet surface, which is divided up into coloured or multi-coloured radiating part surfaces, where the desired luminances of the light-radiating surfaces can be manufactured with a power requirement which is considerably reduced compared with that of the state of the art.

Because the luminous body of the advisory lighting fitting is composed of light conducting plates or hollow bodies arranged above, next to and in each other and having various part surfaces, and because various light sources are assigned to the light conducting plates or hollow bodies corresponding to the part surfaces radiating in various colours, which light surfaces radiate variously coloured light into the respective light conducting plates or hollow bodies, the colour production may be avoided via filtering and the correspondingly greater luminous efficiency of the coloured light sources in the form of one or more light-emitting diodes or coloured fluorescent lamps becomes fully effective.

Through the arrangements specified in the subclaims, advantageous further developments and improvements are possible. It is particularly advantageous that a filter is arranged in front of at least one part surface, which filter has a spectral transmission, which is as great as possible in the wavelength range of the light radiated by the assigned light source and which, when radiated with an external light of another colour, for example white, essentially retains the colour of the supplying light-sources or the radiating surface.

It is also particularly advantageous that the light-radiating surfaces of the light sources and the light entry surfaces of the limiting walls of the luminous body or light conducting plates or hollow bodies are adapted to each other in such a way that essentially the entire radiated light from the light sources reaches the luminous body and that the remaining limiting surfaces, which face the interior of the luminous body, have great reflectivity.

BRIEF DESCRIPTION OF THE DRAWINGS

Embodiment examples of the invention are represented in the drawing and explained more closely in the following description. Depicted are:

FIGS. 9a, 9b, and 9c shows a plan view and two sectional views according to a fifth embodiment example of the present invention.

DESCRIPTION OF THE PROFFERED EMBODIMENTS

Figure 3:
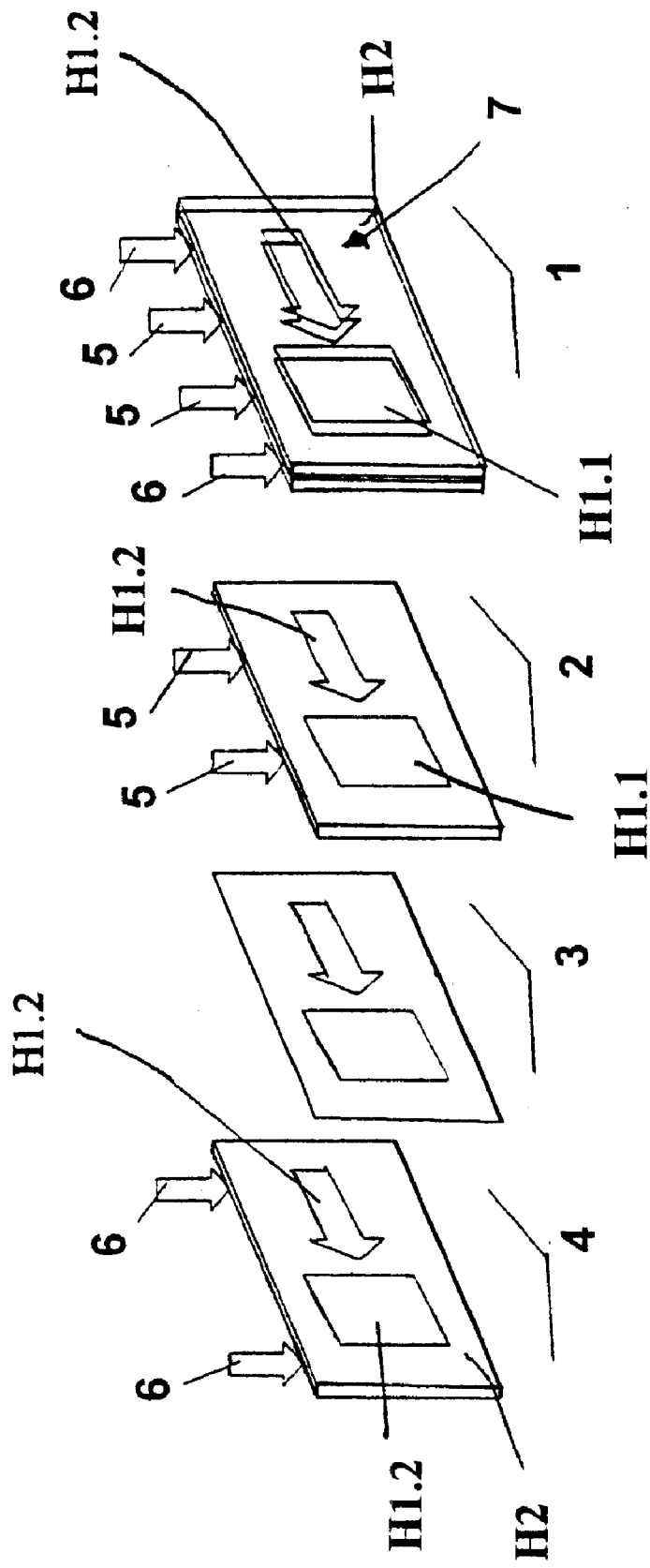
FIG. 3 shows an initial embodiment example of the advisory lighting fitting according to the present invention.

In FIG. 3 an advisory lighting fitting constructed as a emergency sign is depicted on the right, while on the left the individual parts are depicted as an exploded view. The sign 1 radiates light on one side and has a light outlet surface 7 pointing right in the figure, which surface consists of several part surfaces or advisory elements H1.1, H1.2 and H2. H1.1 and H1.2 form a emergency sign and radiate in a white light, while the advisory element H2, which takes up the remaining surface, radiates in a green light. The sign depicted in FIG. 3 should be seen as an example; other forms and colours and other advisory elements may be provided as preferred.

The sign 1 is composed of two light conducting bodies 2 and 4, wherein the light conducting body 2 contains the white-radiating advisory elements H1.1 and H1.2 and the light conducting body 4 contains the advisory element H. To radiate the white advisory elements H1.1 and H1.2, the light conducting plate 2 is provided in the area of the latter with light-deflecting arrangements, i.e. means are provided for interrupting the total reflection taking place in the light conducting plate. This can occur by means of roughening, screening, printing or the like. Over the rest of the area, the light conducting body 2 is constructed to be transparent. At least one light source 5 is provided at the edges, which radiates light into the luminous body via light entry surfaces, wherein the incoming light is white in colour. The radiating light source may be constructed as a narrow fluorescent lamp, although preferably several light-emitting diodes are provided, which are schematically depicted in the embodiment example represented and marked as 5. The individual light-emitting diodes 5 may radiate a white light, although the white colour of the light may also be achieved by a combination of different coloured light-emitting diodes.

The light conducting body 4 is likewise translucent in construction and the advisory elements H1.1 and H1.2 are recessed and the remaining light-radiating surface radiates in a green colour. In addition the light sources may be preferably constructed as green light-emitting diodes 6, which radiate in via the edges of the light conducting body 4. In the area of the advisory element H2 the total reflection is again interrupted by appropriate arrangements. The reverse side of the light conducting plate 4 is preferably provided with a reflective coating.

Figure 2:
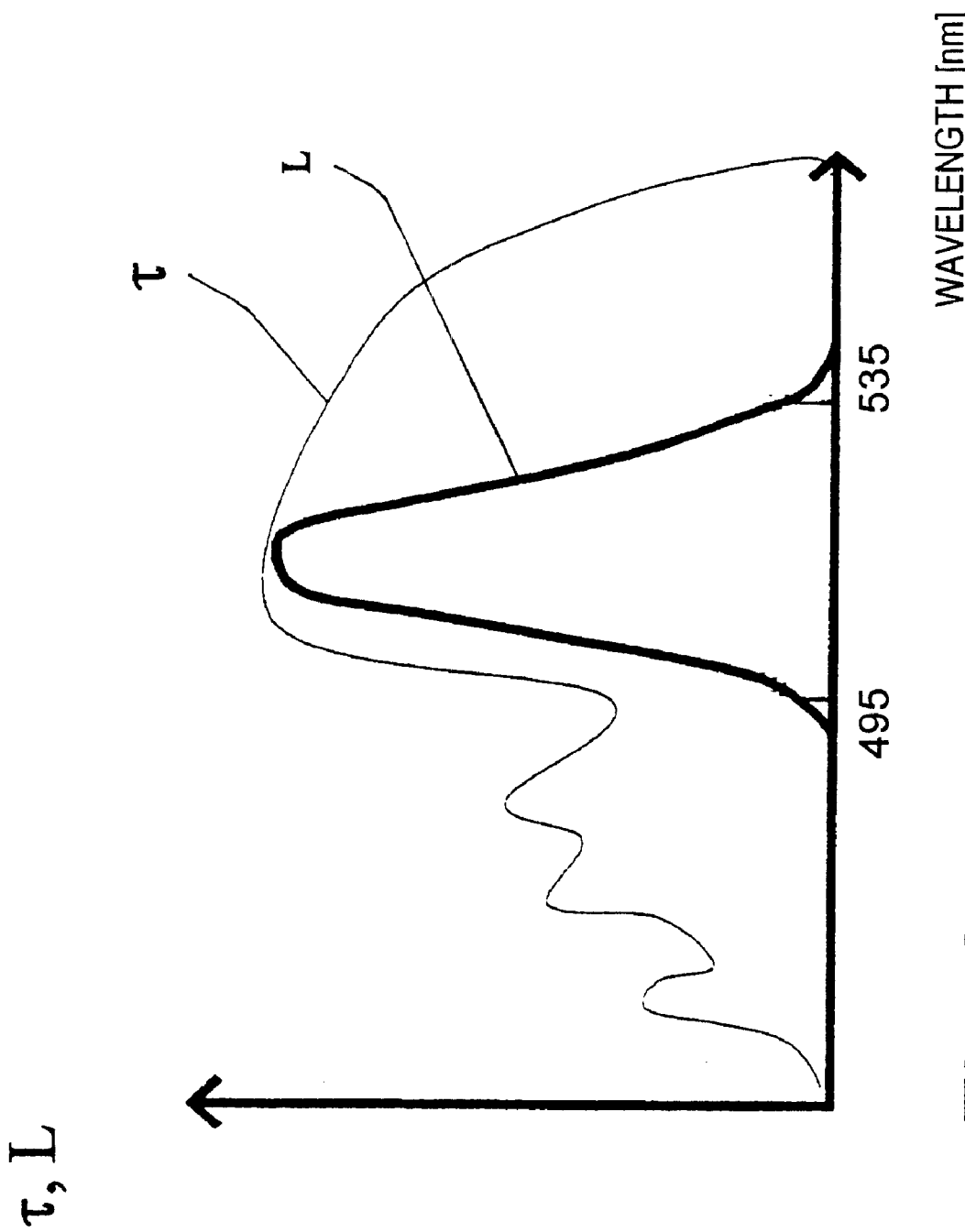
FIG. 2 shows spectral curves of light sources and filters used in the present invention.

In the embodiment example a filter 3 is arranged between the two light conducting bodies 2, 4, which filter has a spectral transmission which has a maximum in the spectral radiation range of the green light-emitting diodes 6. In addition, the filter, which may be constructed as a film, coating or plate, should have such reflectivity and absorptive capacity that the white light striking the filter 3 does not taint the green colour. A typical transmission curve τ of the filter 3 in connection with a spectral luminous intensity distribution L of the green-radiating light-emitting diodes 6 is represented in FIG. 2. In its composite state corresponding to FIG. 3 the light conducting plate 4 with its green surface H2 lights up the rear of the light conducting body 2, wherein the filter 3 also contributes to the green colour. White light striking the sign from outside is also reflected in the green area, at least partially, by the filter 3 with the result that the contrast is great.

In another embodiment example not represented, the entire light conducting body 4 can be constructed to emit green light to simplify manufacture, i.e. there is no recess of the advisory elements H1.1 and H1.2. In this case the reverse side, i.e. the side facing the light conducting plate 4, is constructed in the area of the advisory elements H1.1 and H1.2 in such a way that they are impermeable to light striking them on the reverse side.

Figure 4:
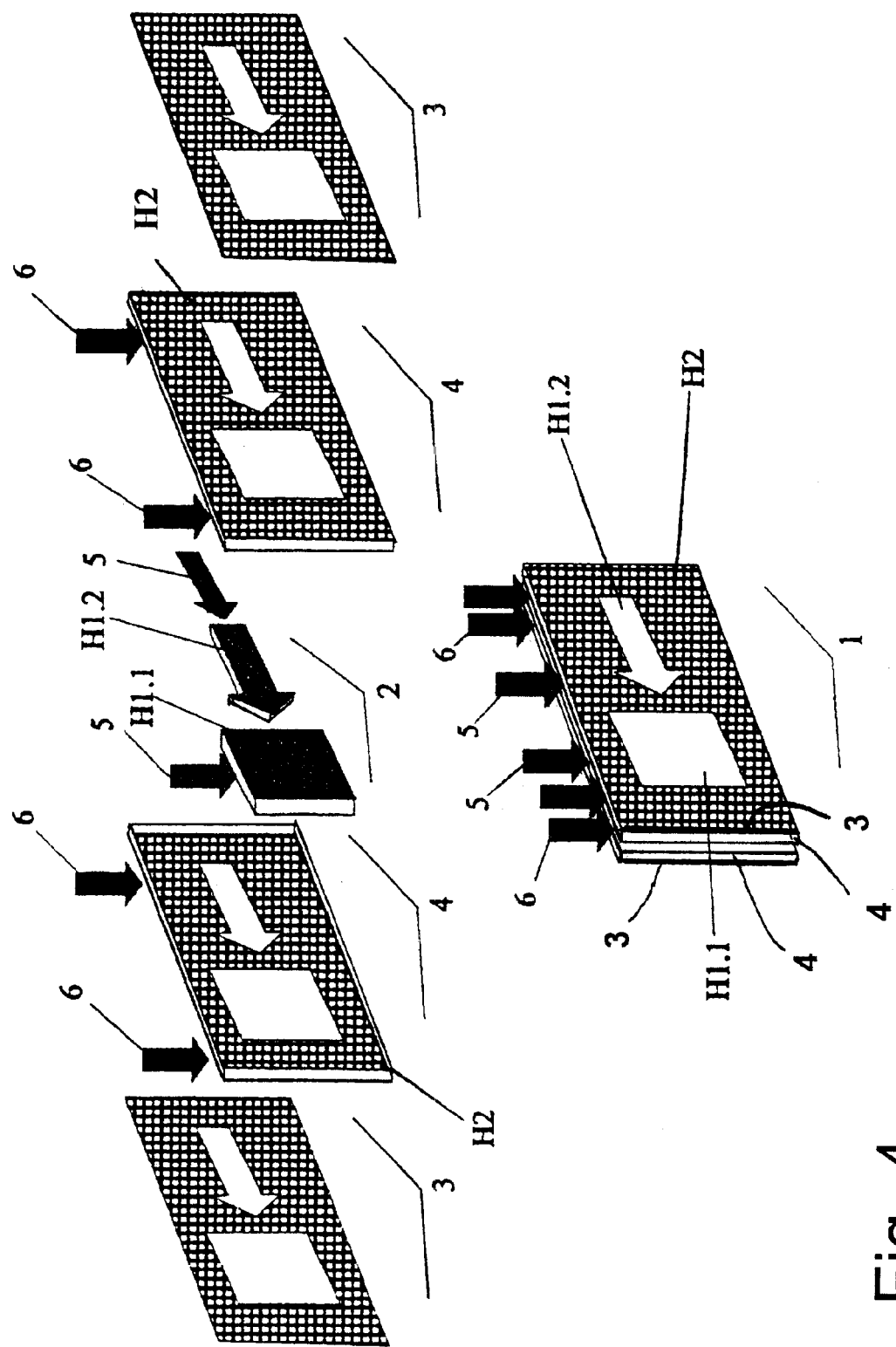
FIG. 4 shows a second embodiment example of the advisory lighting fitting according to the invention.

In FIG. 4 a further variant of the advisory lighting fitting is represented, which in this example radiates light on both sides. In this example two light bodies 4 are provided with recesses for the advisory elements H1.1 and H1.2, into which light-emitting diodes 6 radiate with a green colour. In contrast to the embodiment example according to FIG. 3, a filter 3 is arranged in front of each of the light-radiating surfaces of the light conducting bodies 4, as can be seen in the exploded view of the upper area of FIG. 4. The advisory elements H1.1 and H1.2 are constructed individually as light conducting bodies in the case represented, although obviously they may be realised in a common light conducting plate. In this case there is a gap between the external light conducting bodies 4, which gap is determined by the thickness of the light conducting bodies 2, and in which the supplying white luminances 5 can be accommodated. The contour of the light conducting bodies 2 need not follow exactly the graphic requirements on account of being covered by the subsequent light conducting bodies 4. The edges are likewise constructed to be reflective as far as the light entry surfaces as in the previous embodiment examples.

The material of the light conducting bodies should be selected in such a way that it causes as little loss of absorption as possible, e.g. PMMA, since loss of absorption has an effect due to the multiple reflection that occurs in the interior of the light conducting plates. The non-transmitted light is reflected in the interior, mixed and once again subjected to the procedure of transmission and reflection at the boundary layers. In the case of a single-sided light radiation, it is preferred that the reverse surface of the light conducting body is diffusely reflective, for example with a reflection factor of >97%. This reflectance factor may be realised by suitably impervious material, which is applied to the light conducting plate for example.

Figure 1:
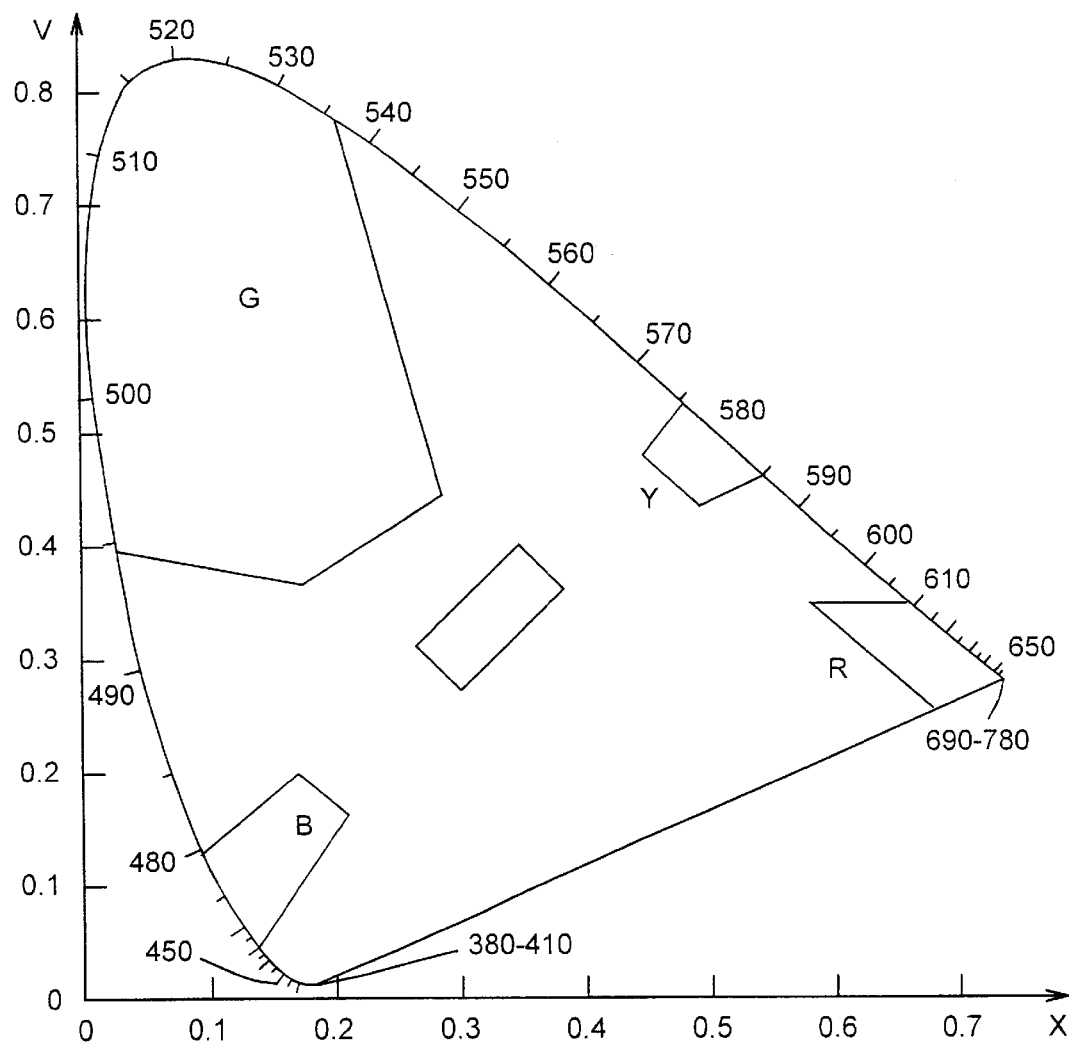
FIG. 1 shows the colour triangle defining the ranges of colour.

Below, the problem of green-radiating surfaces will be addressed by way-of brief explanation. To maintain the green safety colour of the signs referred to above with external light incidence, the light outlet surface of the sign components is covered with a green filter. In FIG. 1 the typical colour range of the green safety colour is depicted in the colour triangle, wherein the desired colour location can be produced both by spectral light of the wavelengths 495 to 535 mm, i.e. with the spectral effective range of green light-emitting diodes, and by an additive combination of a plurality of various wavelengths. With the safety signs according to the state of the art, a green filter is used, the spectral transmission of which is adjusted in such a way that with the usual common rear lighting of the white and green surfaces a given illuminance contrast of 5:1 arises. These filters have low translucency in the wavelength range of the green light-emitting diodes 6. Since, however, the present invention concept allows the luminance of the green surfaces to be adjusted separately from the other white radiating surface, any given contrast possible can be adjusted. Thus it is possible to select filters for covering the green light outlet surfaces, whose spectral transmission has greater translucency in the range of the light-radiating diode wavelengths, without the desired illuminance contrasts being lost to adjacent part surfaces and without the green colour impression being lost through external light radiation with white light. Typical transmissions obtainable in this range are around 80% and above.

Below, a short computational example is given, which shows the effectiveness of the invention.

Specific to the luminous flux requirement of the white surface with safety signs of 60 lm for the production of the desired luminance according to the examples described in the aforementioned state of the art involving conventional technology, the following values result henceforth:

The luminance of the white surface should be 425 cd/m$^2$ the luminance of the green surface consequently is 425/5 (contrast 5:1), namely 85 cd/m$^2$. Given a surface quota of white colour of 33% and an advisory sign size of 150 mm×300 mm, for the diffuse radiation the formula is as follows: luminous flux [1 m]=luminance [cd/m$^2$]×surface [m$^2$]×Π [sr].

$\phi$white=425×0, 33×0, 15×0, 3×3, 14=20 lm $\phi$green=85×0, 67×0, 15×0, 3×3, 14/τ wherein given τ0.8 a luminous flux of $\phi$green=10 lm results. Hence $\phi$ in total=30 lm. The emitted luminous flux of the emergency sign is therefore reduced to approx. 50% with the typical example selected due to the inventive construction. With a luminous efficiency of 10 lm/W, an emergency sign of the size 150 mm×300 mm with an output of the light-emitting diodes of 12 W for luminance in a bright environment and of 12×25/425=0.7 W in the event of emergency operation can be realised by using the inventive principle with light output ratios of 50% and double-sided light emission. The examples described above refer to signs with a green and white radiating surface, although obviously the principle also applies to surfaces radiating other colours.

Figure 5A:
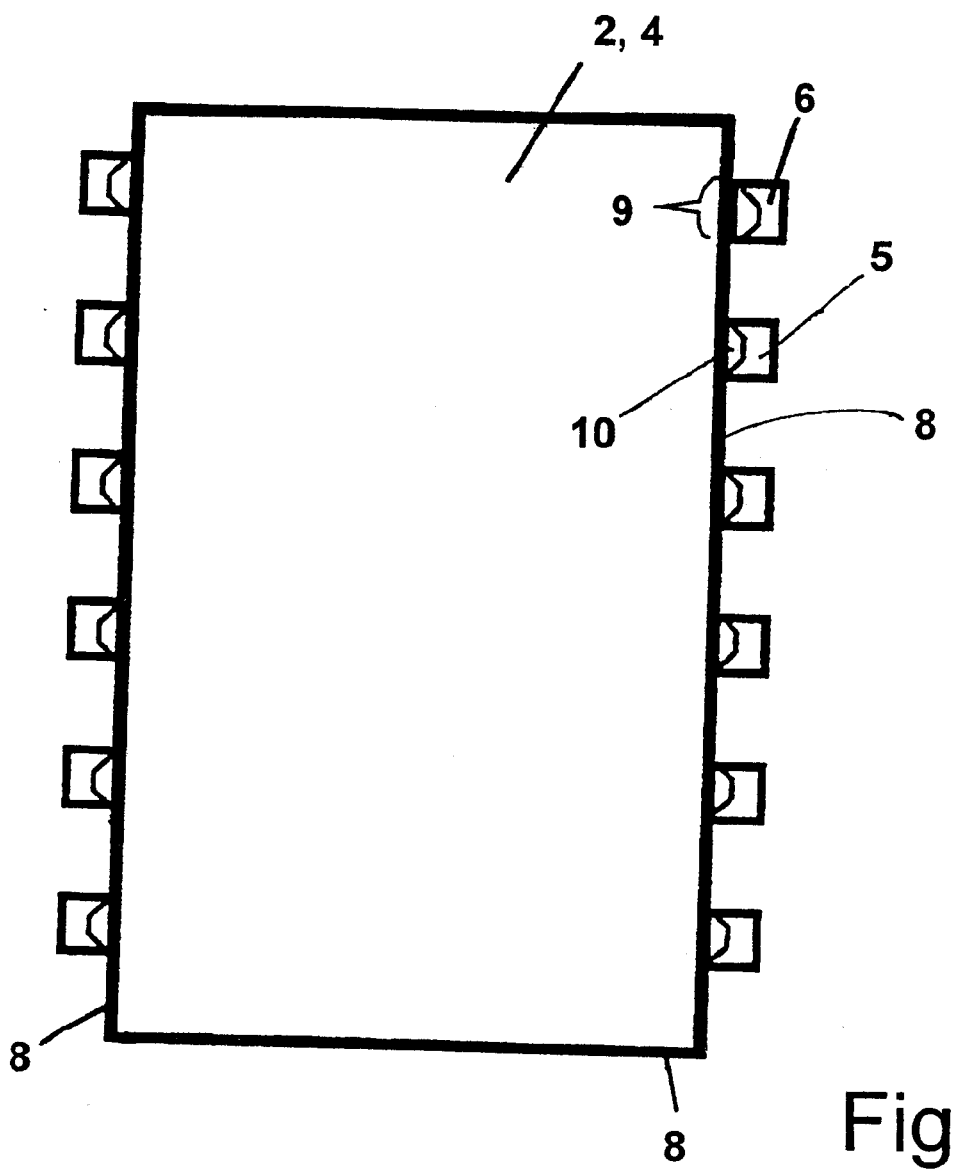
FIGS. 5a and 5b shows an arrangement of the light sources of the embodiment example according to FIG. 3 and FIG. 4.
Figure 5B:
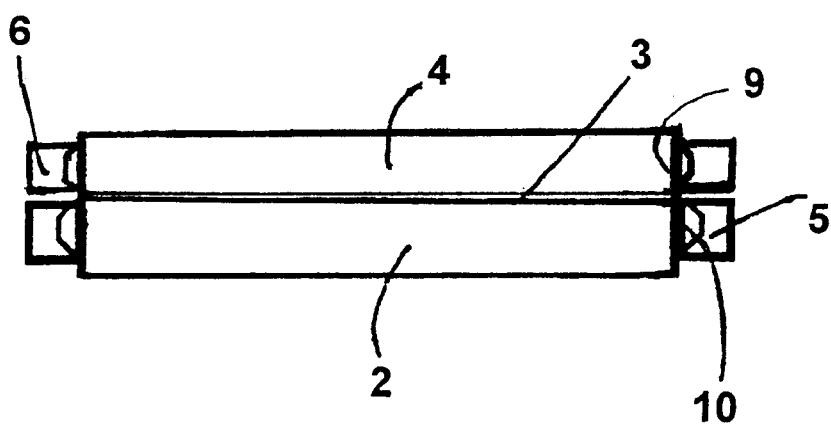

In FIGS. 5a and 5b the light radiating into the light conducting plates 2, 4 is represented by way of example in accordance with the previous examples. The edges 8 of the light conducting plates 4 are constructed to be highly reflective, for example diffuse or reflectively coated. Apart from this coating the light entry surfaces 9 are for the light-emitting diodes 5, 6, which with their radiating surface 10 sit directly on the light entry surface 9 so that the entire light leaving the light-emitting diodes 5, 6 reaches the light conducting plates 2, 4. The light-emitting diodes may be provided with light-guiding optics. The light-emitting diodes are preferably constructed as SMT light-emitting diodes, which have a flat light discharge surface. Instead of the individual light-emitting diodes 5, 6 represented, elongated fluorescent lamps with small diameters and light-guide optics or reflectors may also be arranged over the edges 8 of the light conducting plates 5, 6.

Figure 6B:
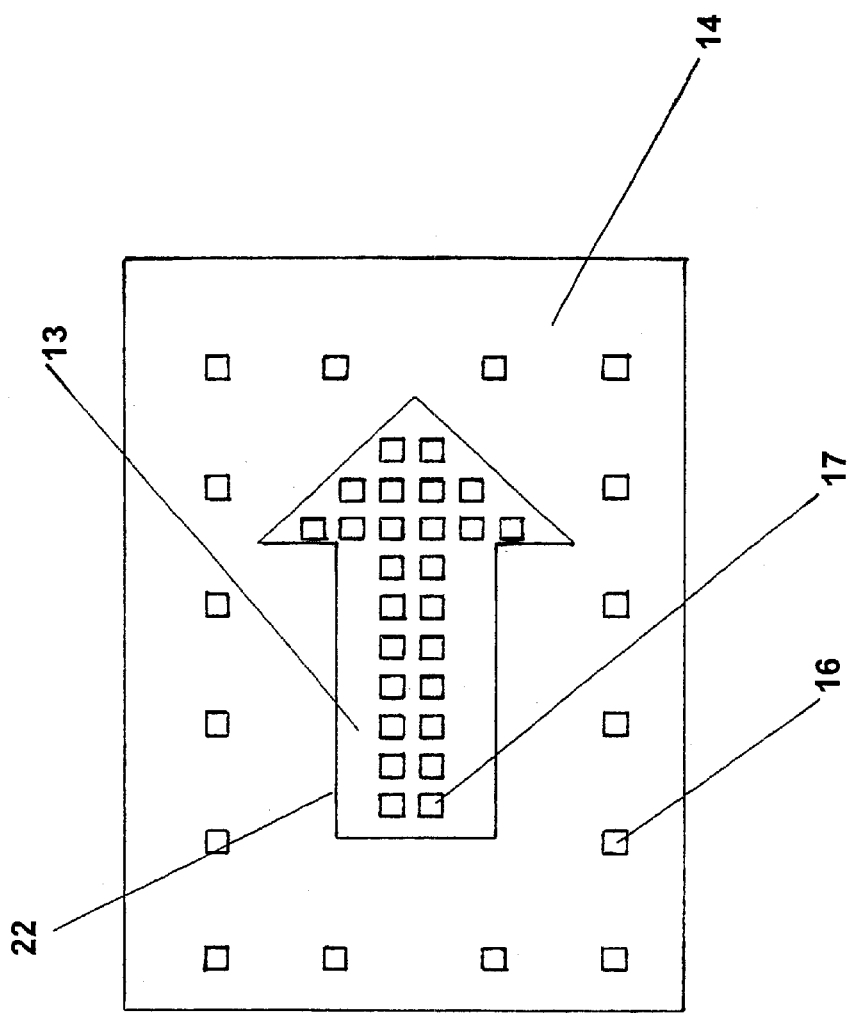
FIGS. 6a and 6b shows a sectional view and a plan view of an advisory lighting fitting according to a third embodiment example of the present invention.
Figure 6A:
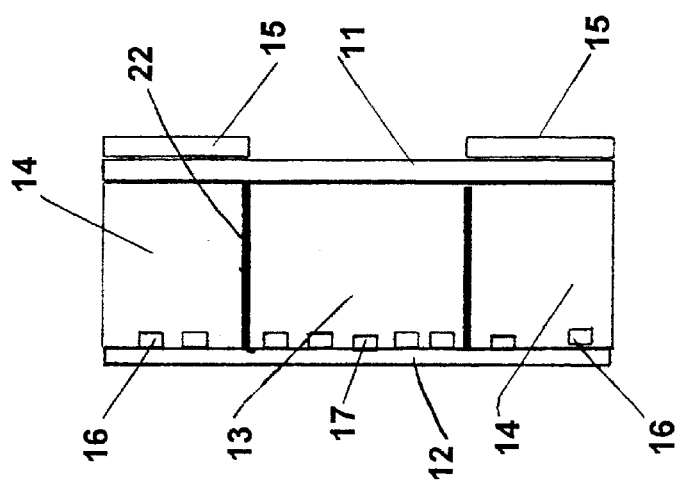

In FIGS. 6a and 6b an advisory lighting fitting is represented as a sectional and plan view. Here too the sign should be described for advisory elements in green and white. Each advisory element is constructed as a hollow chamber or hollow body which has a light-radiating surface and both a rear wall and side walls with a single-sided radiating sign.

In the case represented, two interpenetrating hollow chambers or hollow bodies 13, 14 are provided which have a common translucent cover plate 11 and a common rear wall. One advisory element consists of an arrow that is formed by the hollow body or the hollow chamber 13. The hollow body 13 is accommodated in a hollow body 14 for the advisory element surrounding the arrow, wherein the chambers or bodies 13, 14 are optically distinguished by the dividing walls 22, which simultaneously form the side walls of the hollow body 13 for the arrow and a section of the side walls of the hollow body 14. The arrow radiates in turn in a white light, while the surrounding surface is green. The light outlet surface for the white arrow is supplied via the translucent cover 11, while in front of the hollow chamber 14 for the green advisory element a filter 15 is added that relieves the shape of the arrow and again has a transmission curve corresponding to FIG. 2 and absorptive capacity and reflectivity of such a kind that the contrast between the green and white reflecting surface is maintained with white external light.

On the surface facing the cover 11, there are arranged on or in the rear wall 12 green light-emitting diodes 16 in the area of the hollow body 14 and white light-emitting diodes 17 in the area of the hollow body 13, wherein however, instead of the white light-emitting diodes, various coloured light-emitting diodes may also be provided, which produce a white light in combination. The light-emitting diodes 17 are arranged more compactly in the area of the chamber or the hollow body 13 for the white advisory element because the luminances obtainable on the light radiating surface are greater here.

Figure 7:
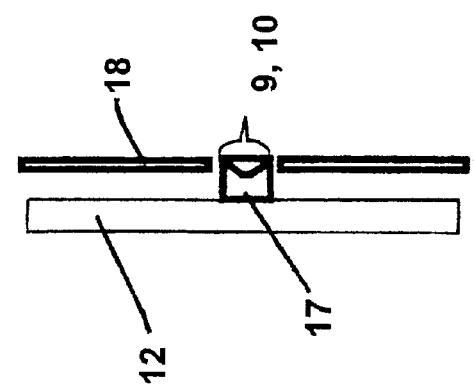
FIG. 7 shows an arrangement of a light source for the embodiment example according to FIG. 6.

The preference is to construct the rear wall 12 as a circuit board which also carries the conductors and, if applicable, components for operating the light-emitting diodes 16, 17. In FIG. 7 the structure of the rear wall 12, which may be constructed simultaneously as a circuit board, is represented more precisely, wherein one light source constructed as an SMT light-radiating diode 17 is attached to the circuit board. The light entry surface 9 of the light-radiating diode 17 projects into the chamber 13, wherein in this embodiment example a reflective film, coating or plate 18, which faces the interior of the luminous body formed from the hollow chambers, is accommodated on the rear wall 12.

In the embodiment example represented in FIG. 6, the hollow bodies 13, 14 providing the light-radiating surfaces for the respective advisory elements have a common cover plate 11 and a common rear wall 12. The sign may also be constructed in a modular manner, however, wherein the modules constitute the individual advisory elements or also contain parts of several advisory elements. The modules may be arranged next to each other and be additionally covered by a common cover plate.

The sign according to FIG. 6 is a single-sided radiating sign, wherein a double-sided luminous body may be realised by arranging two such signs back to back. A circuit board may also be provided, however, which is printed on both sides. This technique is particularly interesting if the circuit boards extend over several lighting bodies, whose light-radiating surface is represented by a common symbol. The lighting bodies may be realised as chambers if the optical distinction is effected by partitioning walls on the contours of the part surfaces. Light-emitting diodes with colours of light corresponding to the light colours can also be arranged then in the various chambers on the same circuit board. The partitioning walls may be manufactured, for example, from extruded profiles made of good reflective material.

The light-reflecting surface of the sign must not be level and rectangular; it may curve outwards or inwards and, for example, be oval or round. In the same way, too, the side walls, which may likewise be constructed as light outlet surfaces, may be curved outwards or inwards. In addition, discoid light conducting elements may be provided in the interior of the respective hollow spaces or hollow chambers, with appropriate arrangements for deflecting the light, into which the light is at least partially supplied from the light entry surfaces. Light conducting elements of this kind can be useful for improving the evenness of the light emission. The entire chamber or its interior may also be filled with a medium which refracts more densely, which may be clear and transparent or volume dispersing, e.g. forward scattering, though the condition applies that losses of absorption must be very small. This is the case with PMMA, for example. Otherwise, with regard to material and properties, that which has been stated in connection with the previous embodiment examples applies.

Figure 8C:
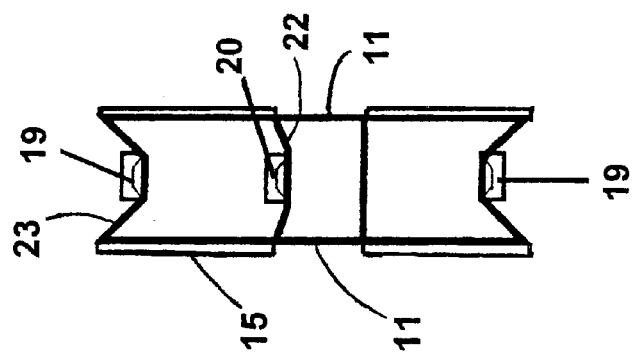
FIGS. 8a, 8b, and 8c shows a plan view and two sectional views of an advisory lighting fitting according to a fourth embodiment example of the present invention.
Figure 8A:
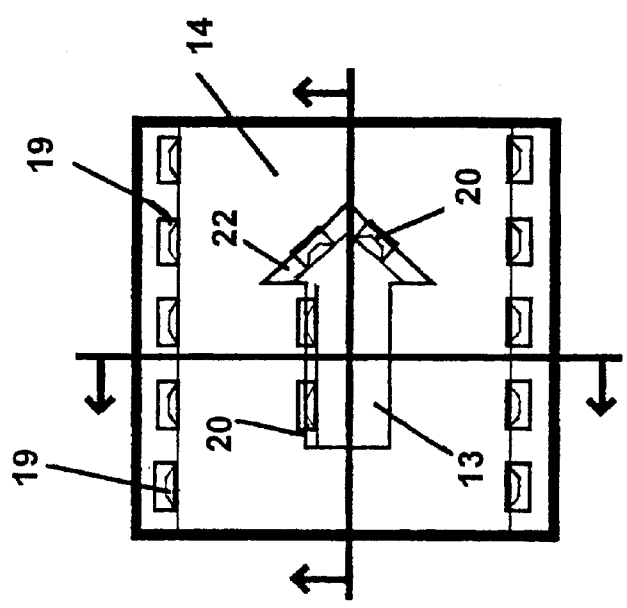
Figure 8B:
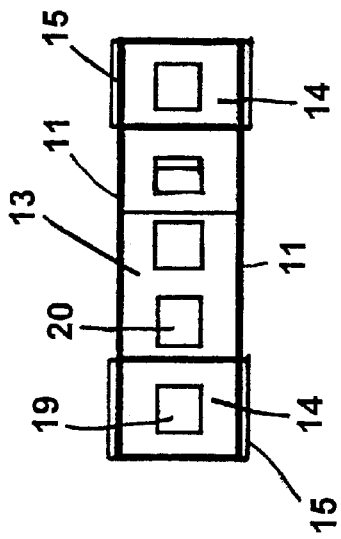

In FIG. 8, a further embodiment example of an advisory lighting fitting with hollow bodies or hollow chambers is represented, wherein FIG. 8a depicts the plan view and FIGS. 8b and 8c depict the sectional views. This sign may be used both as a single-sided radiating sign and as a double-sided radiating sign. In the first case the rear wall is constructed to be reflecting and in the second case a translucent cover plate 11 is provided on both sides, wherein the hollow body or the chamber 14 (green colour) is covered with the spectral filters 15 corresponding to FIG. 6.

As can be recognised in FIG. 8c, at least the upper and lower side surfaces or limiting walls of the hollow bodies 13 and 14 are drawn inwards, wherein the light-emitting diodes 19 and 20 assigned to the chambers 14 and 13 are accommodated in the recesses of the side walls 22, 23 and preferably constructed as SMT light-emitting diodes. The side walls 23 of the chamber 14 are constructed to reflect inwards as far as the light entry surfaces for the light-emitting diodes, while the side walls 22 of the chamber 13 are constructed to reflect both inwards and outwards as far as the light entry surfaces. The number of light-emitting diodes needed is predetermined by the required luminance, the contrast and the evenness.

In FIG. 9, a sign corresponding to FIG. 8 is represented, with which, however, the light radiating into the inner, arrow-shaped hollow body 13 is conducted via light conductors 21. The light conductors 21 are connected on the one hand with the light-emitting diodes 20 for white light, while on the other hand they penetrate the limiting or dividing wall 22 of the arrow-shaped hollow body 13. In the embodiment example represented, it can be recognised from FIG. 9a and FIG. 9b that at least one of the lateral side walls 23 of the outer hollow body 14 is drawn inwards, wherein the light-radiating diode 20 is again arranged in the depression formed.

Obviously, in the other embodiment examples too, the light-emitting diodes may be coupled with light conductors, whose light-radiating surfaces illuminate the respective parts of the luminous body.

Figure 10:
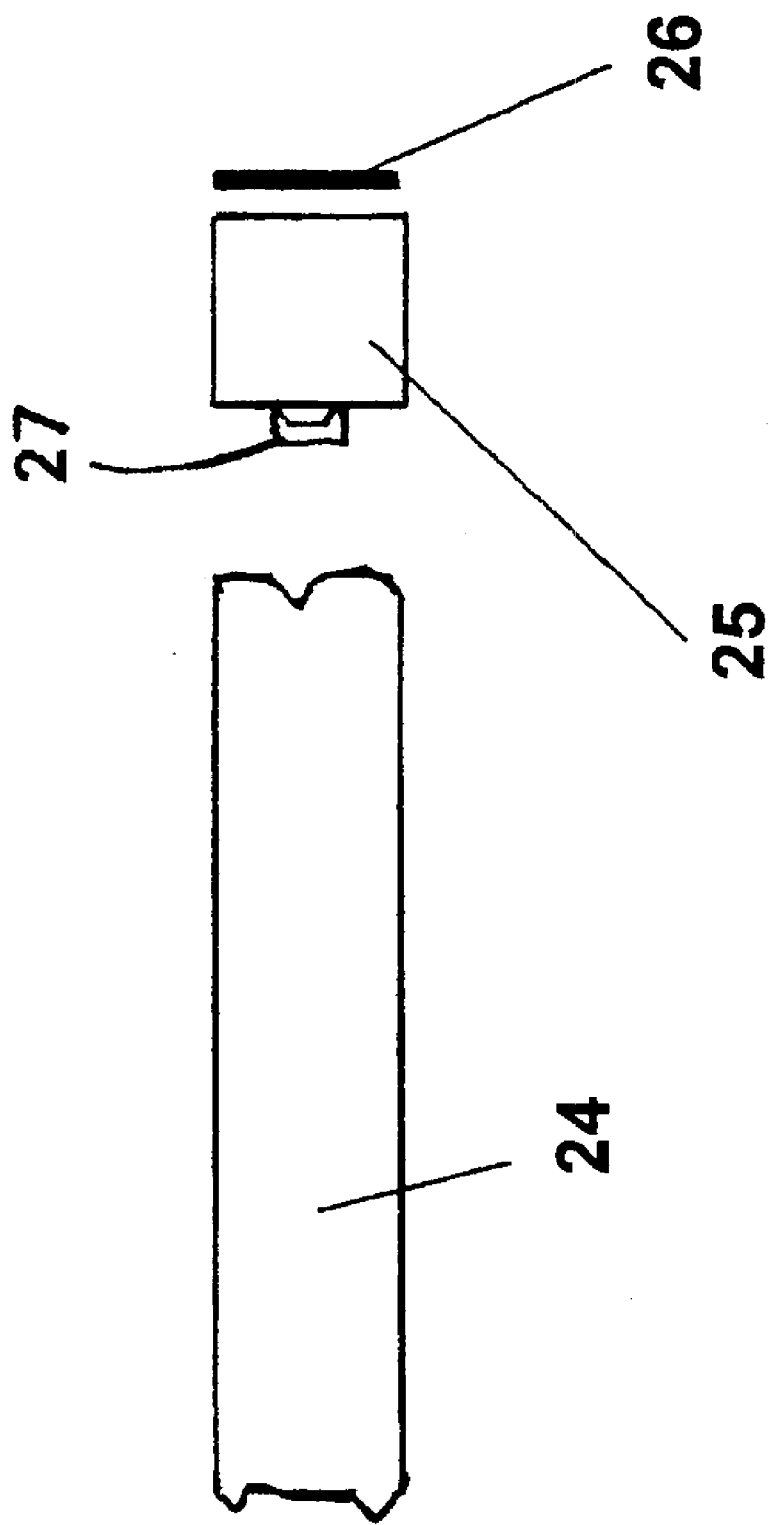
FIG. 10 shows a side view and a sectional view of an advisory lighting fitting constructed as a coloured illuminated strip.

A special case of advisory lighting fittings is represented by the advisory lighting fitting according to FIG. 10. Here only one advisory element is provided, namely an illuminated strip 25, which serves as a guide line and should radiate all over. These strips are especially constructed to be light-dispersing and translucent for the all-over illumination, wherein, to avoid the admission of external white light, through which the green colour impression would be veiled by white, a special filter 26 is arranged in front of the strip 25, whose spectral transmission curve is adapted to the spectral curve of the light-emitting diodes 27 radiating green light. As already remarked, other colours may also be provided for the light radiation.

What is claimed is:

1. An advisory lighting fitting with a luminous body which has at least one light-radiating light outlet surface, which is divided up into part surfaces radiating in various colors, and with a light source arrangement radiating light into the luminous body, the luminous body having a light conduction plate arrangement with limiting walls, wherein the luminous body is composed of light conducting plates, each of which are arranged at least one of above, adjacent to and in each other, the plates having various part surfaces, and that various light sources are assigned to the light conducting plates, corresponding to the part surfaces radiating in various colors, which light sources radiate variously colored light into the respective light conducting plates, and a filter is arranged in front of at least one corresponding part surface of the light outlet surface, the filter having a spectral transmission curve which has a maximum in the wavelength range of the light radiated by the corresponding light source and, moreover, demonstrates such reflection and absorption behavior that the radiated light has a color range which remains intact when subjected to an external light radiation by means of white light.

2. The advisory lighting fitting according to claim 1, wherein the light outlet surface is divided up into part surfaces having a first color and a second color, wherein the luminous body has at least two superimposed light conducting plates, each of which is radiated with variously colored light sources, where, in the light conducting plate of the part surface of the first color, the part surface of the second color is removed, and in the light conducting plate of the part surface of the second color, the part surface of the first color is either blocked or transparent, or wherein the light conducting plate of the part surface of the first color radiates continuously and the light conducting plate of the part surface of the second color is opaque towards one side in the area of the part surface of the second color.

3. The advisory lighting fitting according to claim 1, wherein in the limiting surfaces not serving as a light outlet surface of the luminous body, the light conducting plates are at least partially provided with light entry surfaces for the radiation emanating from the light sources and otherwise demonstrate great reflectivity for the light striking them from the luminous body, and wherein the light-radiating surfaces of the light sources and the light entry surfaces of the limiting walls are configured in such a way relative to each other that essentially the entire radiated light enters the luminous body.

4. The advisory lighting fitting according to claim 1, wherein the light sources are constructed as a plurality of light-emitting diodes and/or tubular fluorescent lamps, preferably with a small diameter.

5. The advisory lighting fitting according to claim 1, wherein the light outlet surface of the luminous body comprises of at least one part surface radiating in a green color and at least one part surface radiating in a white color or a contrast color, which part surfaces together represent an emergency sign, and wherein the at least one part surface radiating in a green color into the luminous body has an effective wavelength range between 595 and 535 nm.

6. The advisory lighting fitting according to claim 1, wherein the light conducting plates radiating variously colored light are optically separated from each other.

7. The advisory lighting fitting according to claim 1, wherein the luminous body is provided with at least one support bearing the light sources, which at least one support contains the electrical lead wires for supplying the light sources and which forms at least one limiting wall of the luminous body or on which is arranged the limiting surface having the light entry surfaces.

8. An advisory lighting fitting with a luminous body which has at least one light-radiating light outlet surface, which is divided up into part surfaces radiating in various colors, and with a light source arrangement radiating light into the luminous body having a hollow body arrangement with limiting walls, wherein the luminous body is composed of hollow bodies, each of which are arranged at least one of above, adjacent to and in each other, the hollow bodies having various part surfaces, and that various light sources are assigned to the hollow bodies, corresponding to the part surfaces radiating in various colors, which light sources radiate variously colored light into the respective hollow bodies, and a filter is arranged in front of a corresponding at least one part surface of the light outlet surface, the filter having a spectral transmission curve which, each light source having a wavelength range, the spectral transmission curve of the filter has a maximum in the wavelength range of the light radiated by the corresponding light source and, moreover, demonstrates such reflection and absorption behavior that the radiated light has a color range which remains intact when subjected to an external light radiation by means of white light.

9. The advisory lighting fitting according to claim 8, wherein at least one hollow body is limited by a translucent cover, side walls and a wall facing the translucent cover, and the light-radiating surface of the at least one hollow body has the contour of a corresponding part surface.

10. The advisory lighting fitting according to claim 8, wherein the hollow bodies have at least partially shared limiting walls.

11. The advisory lighting fitting according to claim 8, wherein in the limiting surfaces not serving as a light outlet surface of the luminous body, the hollow bodies are at least partially provided with light entry surfaces for the radiation emanating from the light sources and the hollow bodies otherwise demonstrate great reflectivity for the light striking them from the luminous body, and the light-radiating surfaces of the light sources and the light entry surfaces of the limiting walls are configured and disposed relative to each other in such a way that essentially the entire radiated light enters the luminous body.

12. The advisory lighting fitting according to claim 8, wherein the light sources are constructed as a plurality of light-emitting diodes and/or tubular fluorescent lamps, with a small diameter.

13. The advisory lighting fitting according to claim 8, wherein the light outlet surface of the luminous body consists of at least one part surface radiating in a green color and at least one part surface radiating in one of a white color or a contrast color, which part surfaces together form an emergency sign, and that the part surface radiating green light into the luminous body preferably has an effective wavelength range between 595 and 535 nm.

14. The advisory lighting fitting according to claim 8, wherein the light conducting plates or hollow bodies radiating variously colored light are optically seperated from each other.

15. The advisory lighting fitting according to claim 8, wherein the luminous body is provided with at least one support bearing the light sources, which support contains the electrical lead wires for supplying the light sources and which forms at least one limiting wall of the luminous body or on which is arranged the limiting surface having the light entry surfaces.

* * * * *